US008412509B1

(12) United States Patent
Pearson et al.

(10) Patent No.: US 8,412,509 B1
(45) Date of Patent: Apr. 2, 2013

(54) INTERACTIVE TRANSLATION TOOL

(75) Inventors: Brent E. Pearson, San Francisco, CA (US); Scott T. Silliman, San Francisco, CA (US); Peter A. Richter, San Francisco, CA (US); Samuel N. Neff, Novato, CA (US)

(73) Assignee: GlobalEnglish Corporation, Brisbane, CA (US)

( * ) Notice: Subject to any disclaimer, the term of this patent is extended or adjusted under 35 U.S.C. 154(b) by 533 days.

(21) Appl. No.: 12/136,239

(22) Filed: Jun. 10, 2008

Related U.S. Application Data

(63) Continuation of application No. 09/617,169, filed on Jul. 17, 2000, now Pat. No. 7,389,221.

(51) Int. Cl.
*G06F 17/28* (2006.01)

(52) U.S. Cl. ............ 704/2; 704/3; 704/4; 704/5; 704/7; 704/8; 715/264; 345/635

(58) Field of Classification Search .................. 704/2–8; 715/264; 345/635
See application file for complete search history.

(56) References Cited

U.S. PATENT DOCUMENTS

| 5,351,189 | A | 9/1994 | Doi et al. |
| 5,371,847 | A | 12/1994 | Hargrove |
| 5,712,995 | A | 1/1998 | Cohn |
| 5,796,401 | A | 8/1998 | Winer |
| 5,838,318 | A | 11/1998 | Porter et al. |
| 5,852,798 | A | 12/1998 | Ikuta et al. |
| 5,884,247 | A | 3/1999 | Christy |
| 5,987,401 | A | 11/1999 | Trudeau |
| 6,064,951 | A | 5/2000 | Park et al. |
| 6,119,078 | A | 9/2000 | Kobayakawa et al. |
| 6,313,854 | B1 | 11/2001 | Gibson |
| 6,493,003 | B1 | 12/2002 | Martinez |
| 6,522,999 | B2 | 2/2003 | Fuji |

OTHER PUBLICATIONS

WordReference, Oct. 13, 1999, p. 1.*
Systran, Free Online Translation, systran.com, Jan. 1999, p. 1.*
AltaVista, Press Room—AltaVista News Releases, Jun. 10, 2000, pp. 1-3.
AltaVista, AltaVista Translations (i.e., BabelFish), Printed Nov. 1, 2000, p. 1.
Welcome to the New R-O-Matic Italian/English Dictionary, May 13, 1998, p. 1.
Word Perfect 3.5 Creating a Document Editing Text, Jan. 15, 1998, pp. 1, 2.

* cited by examiner

*Primary Examiner* — David R Hudspeth
*Assistant Examiner* — Lamont Spooner
(74) *Attorney, Agent, or Firm* — Aka Chan LLP

(57) ABSTRACT

The present invention provides an interactive system and method for effective and convenient language translation. The system and method provides a translation window that is opened in conjunction with a Web page window containing Web pages hosted on the Internet. The translation window and Web page window are automatically adjusted in size and position so that they fit on one user-viewable screen without overlapping. The translation window is linked to a translation dictionary database accessible through the Internet which provides accurate and comprehensive definitions of the words that are identified to be translated.

31 Claims, 11 Drawing Sheets

```
/*
* javascript code used to draw large original page and then to open small
* Traveling Translator window
*/

//provides return key functionality
function loadPage ( ) {
var f = getframe (1) .document .forms;
if (f && f[0] ) {
f [0] .Loc.onkeydown = checkKey;                    510
f[0] . Loc.focus( );

}
}
// opens new window
function loadNew ( )   {
Obj. Win = "trav";
var lang = User.Lang ? User.Lang : geLang ( );
var newU = window.getFrame (1) .document.URLForm.Loc.value;
if (lang == "EN")  {                                  520
    alert("First choose a translation language.");   530
    return (false) ;
}
else if (newU.length <8)                              540
    alert ("Please enter a valid URL");               550
else
{
   var lw = 200;
   var lh = 500;
   var lf = "height=" + lh + "width=" + lw +
",resizable=yes, scrollbars=no, toolbar=no, menubar=no, status=no, location=no, left=3
,top=30";

var o=new Object ( );
   o.ClassId=204;
   o.Id=203672;

var lnk=doLinkStr (o, obj.Lang, false);
   window.open(lnk, "transword", lf);
   }
}
//searches for return key press
function checkKey (e)
{
var returnKey = "13";
var key;

if(isIE)
    key = window.getFrame(1) .event.keycode;
else
    key = e.which;
if (returnKey == key) {
   loadNew ( );
   return (false) ;
}
}
```

FIG. 5A

```
//returns text for appropriate user language
function drawcopy ()
{
ulang=Obj.Lang
var whichVar="";
if (ulang=="DE-DE")
   whichVar="<=var4>"
if (ulang=="FR-FR")
   whichVar="<=var5>"
if (ulang=="IT-IT")
   whichVar="<=var6>"
if (ulang=="JA-JP")
   whichVar="<=var7>"
if (ulang=="PT-BR")
   whichVar="<=var8>"
if (ulang=="ES-MX")
   whichVar="<=var9>"
if (ulang=="ES-ES")
   whichVar="<=var10>"

return whichVar;
}

//we don't support Chineese or Korean -- this checks for that
function goodLang () {
var p = parent;
if (natLang () == langArray [7] || natLang () == langArray [8] || natLang () == langArray [9] )
       return false;
else
       return true;
}

// draws form header
function noLink () {
var s = " ";
if (goodLang ())
{
s += ",form name=URLFORM><=var2><br><input type=text name=Loc size=20
value=http://> <input type='button' name='Go' value= '<=var11>'
onClick='parent.loadNew ()'></form>"; }
return s;
}
```

```
/*
* javascript code used to draw small window, create server query
* and open new large window as requested by user
*/

//differentiates between traveling translator and
//translate word feature of site (same as functionality)

function loadpage( )  { var sel=getURLParam("transword") ;
var f = window.frames [0].document.forms;
if  (f && f[0] )
f[0] .onkeydown = checkKey;

if (window.opener)
{
    if (window.opener.Obj.Win == "trav")
       openWin( );
    else
        getDef (sel);

}
}

//opens new browser window for requested url
function openWin( )  { var lw  =  200;
var lh  =  350;
var sw  =  screen.width;
var sh  =  screen.height;
var bf="resizable, scrollbars, toolbar, status, location, menubar";
bf += "height="+(sh-130)+" ,width=" + (sw-lw-25) + ",left=" + (lw+15) +
",top=30";
var site=window.opener.frames [1] .document .URLForm.Loc.value;
var win=window.open (site, "outside", bf) ;
if (!isIE || isIE5)
win.focus ( );
getFrame (0) .document .forms [0] .search.focus ( ) ;

}
//call to server for translation
function getDef (sel)
{
var lang = User.Lang ? User.Lang : getLang( );
var f = getFrame (0) .document .forms [0];
if (sel == "true")
sel = f.search.value ;

dirStr="";
if (sel != "" && sel != "undefined")
{
f.search.value = sel;
sel = sel.replace(/^\s+|\s+$/, "");
var tdStr = serverPath () + "reference/td/td.asp";
f.lang.value = lang
```

*FIG. 8A*

```
f.action = IdStr;
f.target = 'bottom';
f.submit( );

setTimeout ("getFrame (0) .document.forms [0] .search.focus ( )", 1500) ;

}
else if  (sel == "" && window.opener.Obj.word)
    alert("Please enter a word");                          ← 650

}

// determine which language to display translation direction choices
function getFirstVar ( )
{
var ulang = User.Lang ? User.Lang : geLang ( );
var whichVar="";
if (ulang=="DE-DE")
    whichVar="<=var2>"
if (ulang=="FR-FR")
    whichVar="<=var8>"
if (ulang=="IT-IT")
    whichVar="<=var6>"
if (ulang=="JA-JP")
    whichVar="<=var10>"
if (ulang=="PT-BR")
    whichVar="<=var12>"
if (ulang=="ES-MX")
    whichVar="<=var14>"
if (ulang=="ES-ES")
    whichVar="<=var16>"

return whichVar;
}

Function getSecVar ( )
{
var ulang = User.Lang ? User.Lang : geLang( );
var whichVar="";
if (ulang=="DE-DE")
    whichVar="<=var3>"
if (ulang=="FR-FR")
    whichVar="<=var9>"
if (ulang=="IT-IT")
    whichVar="<=var7>"
if (ulang=="JA-JP")
    whichVar="<=var11>"
if (ulang=="PT-BR")
    whichVar="<=var13>"
if (ulang=="ES-MX")
    whichVar="<=var15>"
if (ulang=="ES-ES")
    whichVar="<=var17>"

return whichVar;
}
```

FIG. 8B

```
// determine if Traveling Translator or Translate Word image appears on top of
the page
function getImage( )
{
var s = "";
if (window.opener && window.opener.Obj.Win == "trav")
    s += "<img src=../gimg/tt_label.jpg border=0>";
else
    s += "<img src=../gimg/ttword.gif border=0>";
return s;
}
// uses smaller text box for double-byte Netscape users
function getBoxSize( )
{
s = "";
s += "<input type=text name=search size=";
if (useDByte( ) || !isIE || User.Lang == "JA-JP")
    s += "12>";
else
    s += "25>";
return s;
}

// looks for return key being pressed
function checkKey (e)
{
var returnKey = "13";
var key;

if(isIE)
    key = window.getFrame (0) .event.keycode;
else
    key = e.which;

if(returnKey == key) {
    sel = getFrame (0) .document.forms[0] .search.value;
    getDef(sel);
    return (false);
}
}

//resize function for netscape users who resize thier window
    if (!window.saveInnerWidth)  {
        window.onresize = resizeIt;
        window.saveInnerWidth = window.innerWidth;
        window.saveInnerHeight = window.innerHeight;
    } function resizeIt ( )  {
        if (saveInnerWidth < window.innerWidth ||
            saveInnerWidth > window.innerWidth ||
            saveInnerHeight > window.innerHeight ||
            saveInnerHeight < window.innerHeight)
        {
            window.history.go (0);
        }
    }
}
```

INTERACTIVE TRANSLATION TOOL

CROSS-REFERENCE TO RELATED APPLICATION

This patent application is a continuation of U.S. patent application Ser. No. 09/617,169, filed Jul. 17, 2000 and issued as U.S. Pat. No. 7,389,221 on Jun. 17, 2008, which is incorporated by reference.

BACKGROUND OF THE INVENTION

The present invention pertains to the field of language translation. More specifically, the present invention relates to an interactive language translation system and method used through the Internet.

An interactive language learning program, via, e.g., the Internet, that can reach a large number of users in varied locations, and which allows the users to work on their own schedule and at their own pace can stimulate language learning in a variety of locations not accessible or successfully accessed by other, static, language learning programs.

A useful component of an interactive language learning program is a convenient and accurate translation means or program that can provide a user translations for a variety of materials both inside and outside the language learning course materials. In this manner, a translation program can be used to supplement the user's language learning experience.

Probably the best known translation system is the various hard copy language translation dictionaries. However, these dictionaries have drawbacks that render them generally unsuitable for effective language learning. They are not interactive, and thus users often find them dry and difficult to deal with. These inherent traits can translate into a user's dissatisfaction with the language learning experience in total, and ultimately defeat the program's goal to stimulate and encourage language learning. Too, hard copy translation dictionaries may be difficult to procure, or the copies that are available may not be current. Again, these problems can manifest in a user's overall dissatisfaction with the underlying language instruction.

There are also known Web-based translation programs that currently exist, yet each of these known programs also have characteristics that make them unsatisfactory for interactive language learning instruction. First, many of the known translation programs translate an entire target Web page. These translations are often inaccurate because they provide literal translations without regard for sentence structure or context. Also, by providing a translation of an entire Web page, these programs are counterproductive to language learning. Language instruction is most successful when it is interactive, and when the student is stimulated to put forth the effort to learn. One component of language learning is reading comprehension. Yet, when a student is able to receive an entire translation of any particular Web page on the Internet, he/she will not derive any motivation to try and translate on their own. Thus, by using currently available translation programs on the Internet, the language student loses opportunities to become more proficient at reading and learning the second language.

Also, many of the known Web-based translation programs are difficult to use, especially when a user/student opens and closes Web pages while he/she is browsing the Internet. In particular, with the known translation programs hosted on the Internet, the user/student can only see either the original Web page, or the translated Web page provided by the translation program. The user can try and adjust the position and size of the two pages on their screen to view them simultaneously, but this is inconvenient at best, and can be a cumbersome or even difficult task for many novice users. Moreover, each time the user wishes to view and translate a new Web page, they will be required to once again position and size the new Web page and the translation page if they want to view, and thus compare, both simultaneously. Too, with known Web-based translation programs, the user must separately open and close the translation program page in order to translate various different Web pages, and thus, must keep track of both the Web site of interest, and the Web page hosting the translation program.

Therefore, there is a need for a language translation program offered through the Internet that overcomes these limitations and is appropriate for a language learning context.

BRIEF SUMMARY OF THE INVENTION

The present invention relates to an interactive language translation program. An objective of the present invention is to provide an interactive and convenient system and method for translating information identified by a user/student while the user/student browses various Web pages on the Internet.

In an embodiment of the present invention, a system for language translation comprises a translation window that is created by a program in a primary Web page and is opened in conjunction with a Web page window containing a secondary Web page. The translation window and the Web page window are positioned and sized so that the translation window and the Web page window fit on the user's screen simultaneously, without overlapping. The system includes a translator that is linked to a translation dictionary database. The translation window comprises an input field for a user to provide information in a first language, and an output field comprising information in a second language corresponding to the translation of the information in the first language.

In another embodiment of the present invention, a method of language translation comprises providing a translation window that is executed by a program in a primary Web page that is opened in conjunction with a Web page window. The translation window and Web page window are adjusted in size and position to allow both to be simultaneously viewed on a user's screen, without any overlap. This method further comprises receiving input information in a first language, translating the information from the first language to a second language, and outputting the information in the second language.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 5A and 5B depict JavaScript code for opening a translation window;

FIGS. 8A, 8B, and 8C depict JavaScript code for creating a server query, and opening a Web page window on a user's screen.

DETAILED DESCRIPTION OF THE INVENTION

In the following description, for purposes of explanation, numerous specific details are set forth in order to provide a thorough understanding of the present invention. It will be apparent, however, to one skilled in the art, that the present invention may be practiced without these specific details. In other instances, well-known structures and devices are shown and/or described in a generic form in order to avoid unnecessarily obscuring the present invention.

A user of the interactive translation application or program uses a computer, or other similar device. In an embodiment, the computer or other device is capable of accessing the Internet, or World Wide Web (WWW). The user views the various Web pages, or screens, of the program, on a display, or screen, connected to, or otherwise associated with, the device used to access the Internet. The user interacts with the translation program by inputting information to the program via a keyboard, mouse, touch pad and/or other device(s) capable of inputting characters and clicking on, or otherwise choosing, buttons, boxes, menus and Web pages on their display.

Figure 1:
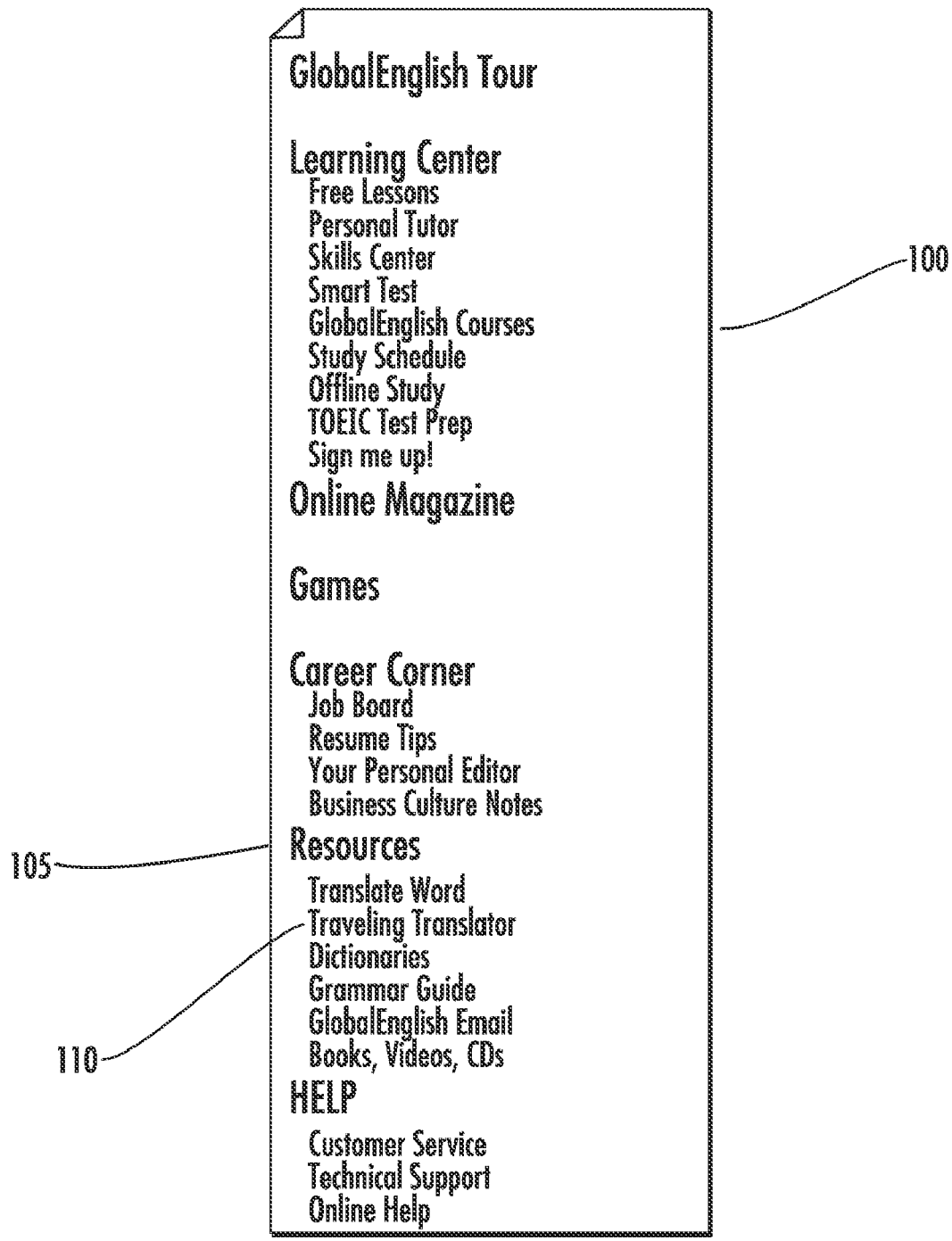
FIG. 1 depicts a subject board on a home Web page.

The system and method of the present invention are practiced by accessing a primary Web page. This Web page may include an index or subject board that lists various links to offered programs and services. An example subject board 100, depicted in FIG. 1, shows a Resources heading 105 and a link 110 to a translation program, e.g., the "Traveling Translator™." A user may use the translation program by clicking on, or otherwise selecting, link 110.

Figure 2:
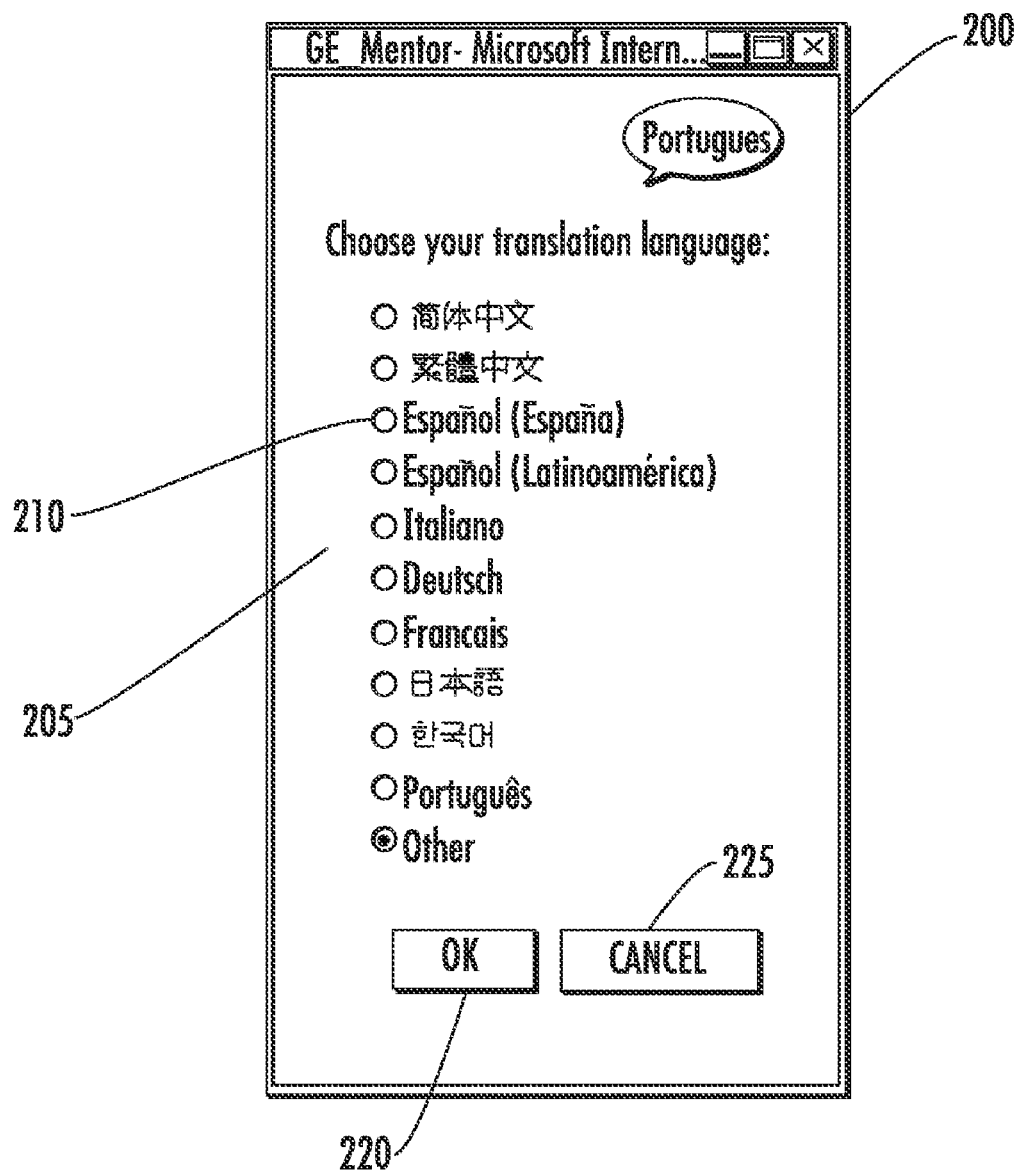
FIG. 2 depicts a language choice window.

After selecting link 110, a user can be prompted to select a translation language. An exemplary language choice window 200, depicted in FIG. 2, provides the user with a choice of a number of translation languages 205. The user may choose any of the designated languages by selecting the appropriate button 210 next to the language 205 in the language choice window 200. After choosing the desired translation language 205, the user clicks on the "OK" button 220 and accesses the translation program Web page. Alternatively, if the user wishes to exit the language choice window without accessing the translation program Web page, he/she may click on the "Cancel" button 225.

In another embodiment, the translation program is accessed via an on-line language learning instruction course, and the translation language for the translation program automatically defaults to the language learning user's native language, which he/she designated at some earlier time in accessing the instruction materials. In this embodiment, when the user clicks on link 110 of FIG. 1, the translation program Web page is immediately accessed.

Figure 3:
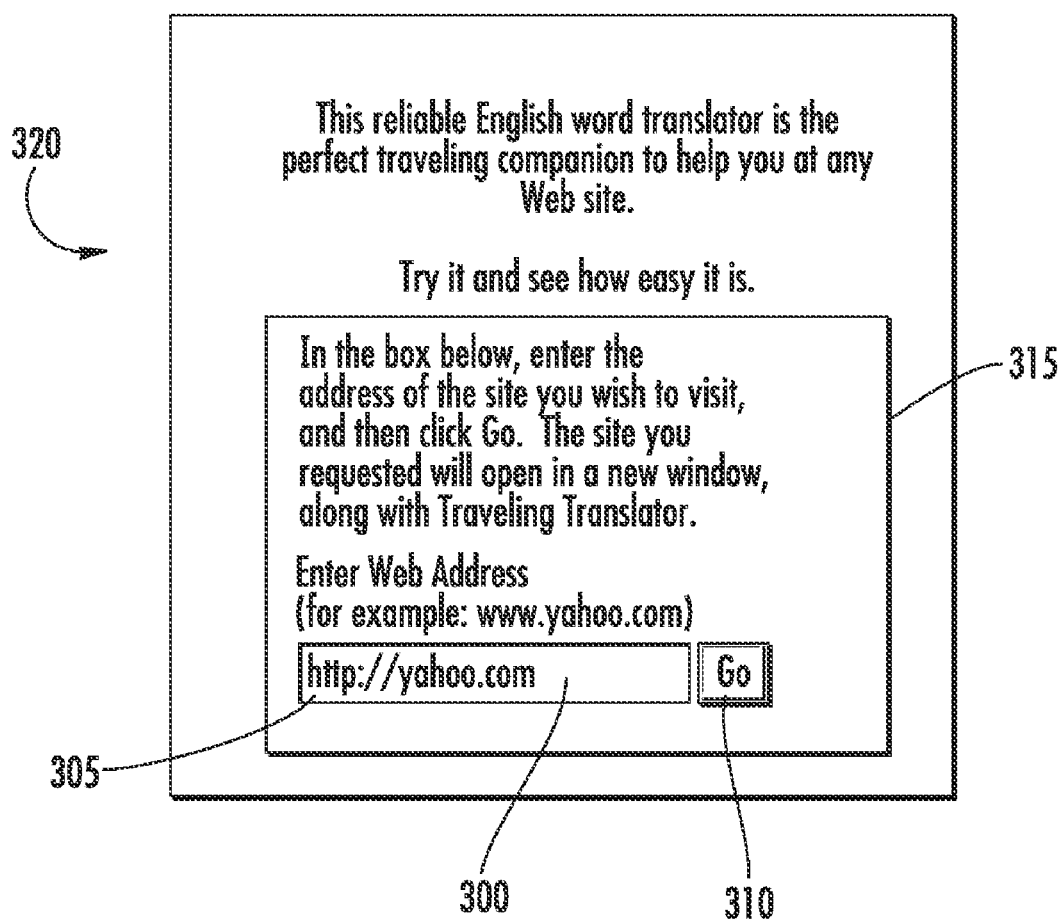
FIG. 3 depicts a translation program Web page.

An exemplary translation program Web page 320, shown in FIG. 3, provides instructions 315 that describe how the user is to use the translation program in conjunction with Web sites hosted on the Internet. In order for the user to use the translation program while accessing various Web sites, the user types a URL 305 of a desired Web page in text box 300. For example, the user may type a URL, as indicated in text box 300. To then use the translation program with the Web page at URL 305, the user clicks on the "GO" button 310.

Figure 4:
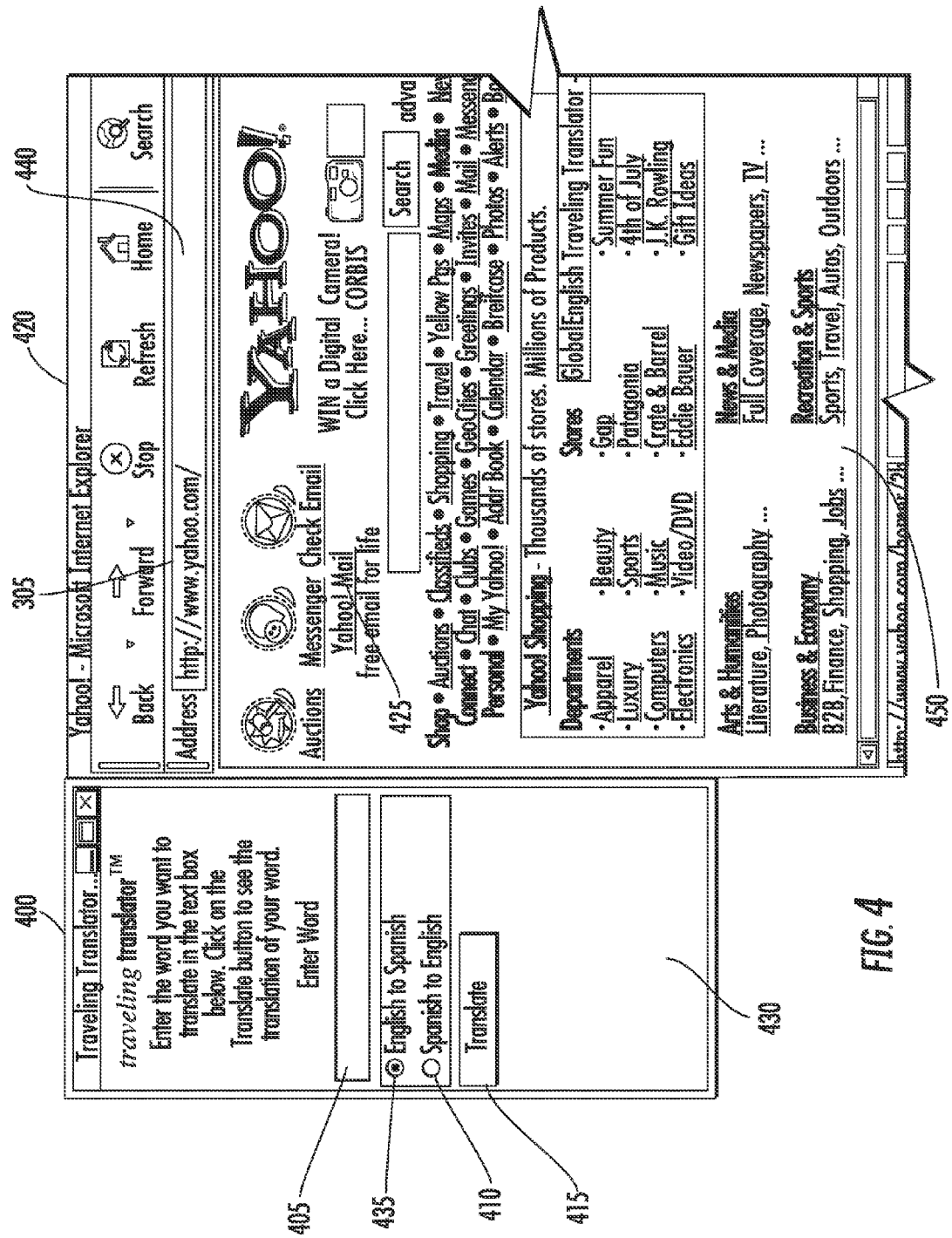
FIG. 4 depicts a translation window adjacent to a Web page window containing a secondary Web page.

As shown in FIG. 4, a translation window 400 is created by a program hosted by the primary Web page, and is opened in conjunction with a Web page window 420 containing the secondary Web page 450 selected by the user in text box 300 of FIG. 3. The translation window 400 and the Web page window 420 are automatically sized and positioned so that they simultaneously fit on one user visible screen without overlapping. Through this process, the user is able to view the secondary Web page 450 while having access to the translation window 400, without having to make any adjustments in the size or position of either.

An embodiment JavaScript code 510 for opening a translation window 400 is shown in FIGS. 5A and 5B. The JavaScript code 510 also first checks 520 to see if a translation language has been previously selected by the user. If not, an "alert" message is displayed to the user 530, indicating that the user should first choose a translation language. The JavaScript code 510 further checks 540 to see if the user has indicated a valid URL, by checking the length of the URL input into text box 300. If no URL was input, or it is deemed invalid, the JavaScript code 510 causes an "alert" message to be displayed to the user 550, indicating that the user should enter a valid URL into text box 300.

Referring again to FIG. 4, in an embodiment, the translation window 400 includes an input field 405, a translation direction field 410, a "Translate" button 415 and an output field 430. In an embodiment, the user may type a word or phrase to be translated into the input field 405. The word or phrase is generally expected to come from the secondary Web page 450 displayed with the translation window 400, but there is no constraint or requirement for this.

In other embodiments, the user may drag-and-drop or right-click a word or phrase from the secondary Web page 450 to transfer the word or phrase to the input field 405. For example, as shown in FIG. 4, a user may right click on a first target word 425 (e.g., "Mail"). In this manner, the word "Mail" will be input to input field 405.

To enhance the flexibility of the translation program, in an embodiment, the translator will accept one or more search modifiers such as, but not limited to, "exact match," "contains" and "starts with." Thus, the user can either translate specific words ("exact match") or key off of words in the secondary Web page 450, or elsewhere, to learn the translations for related words ("contains" or "starts with" options).

In an embodiment, the input field 405 will only accept a word or a short phrase (e.g., less than five words). In another embodiment, the input field 405 will only accept one word at a time. In these embodiments, the user is precluded from systematically relying on the translation system to the detriment of exerting his/her own efforts to master a new language. Thus, by limiting the amount of material that a user can translate at once, the user is provided immediate support for language learning difficulties while also encouraged to achieve greater reading comprehension skills in the language they are working to learn.

In an embodiment, the translation direction field 410 provides two options to the user. The user can either translate from English to their translation language, or alternatively, from their translation language to English. In the exemplary translation direction field 410 of FIG. 4, the user has selected option 435 that is "English to Spanish"; i.e., the user has chosen to translate from English to their translation language, Spanish. Thus, the user would input an English word or phrase in the input field 405, and receive back the Spanish translation in the output field 430. Alternatively, if the user had chosen the option "Spanish to English," the user would input a Spanish word or phrase in the input field 405 and receive back the English translation in the output field 430.

Figure 6:
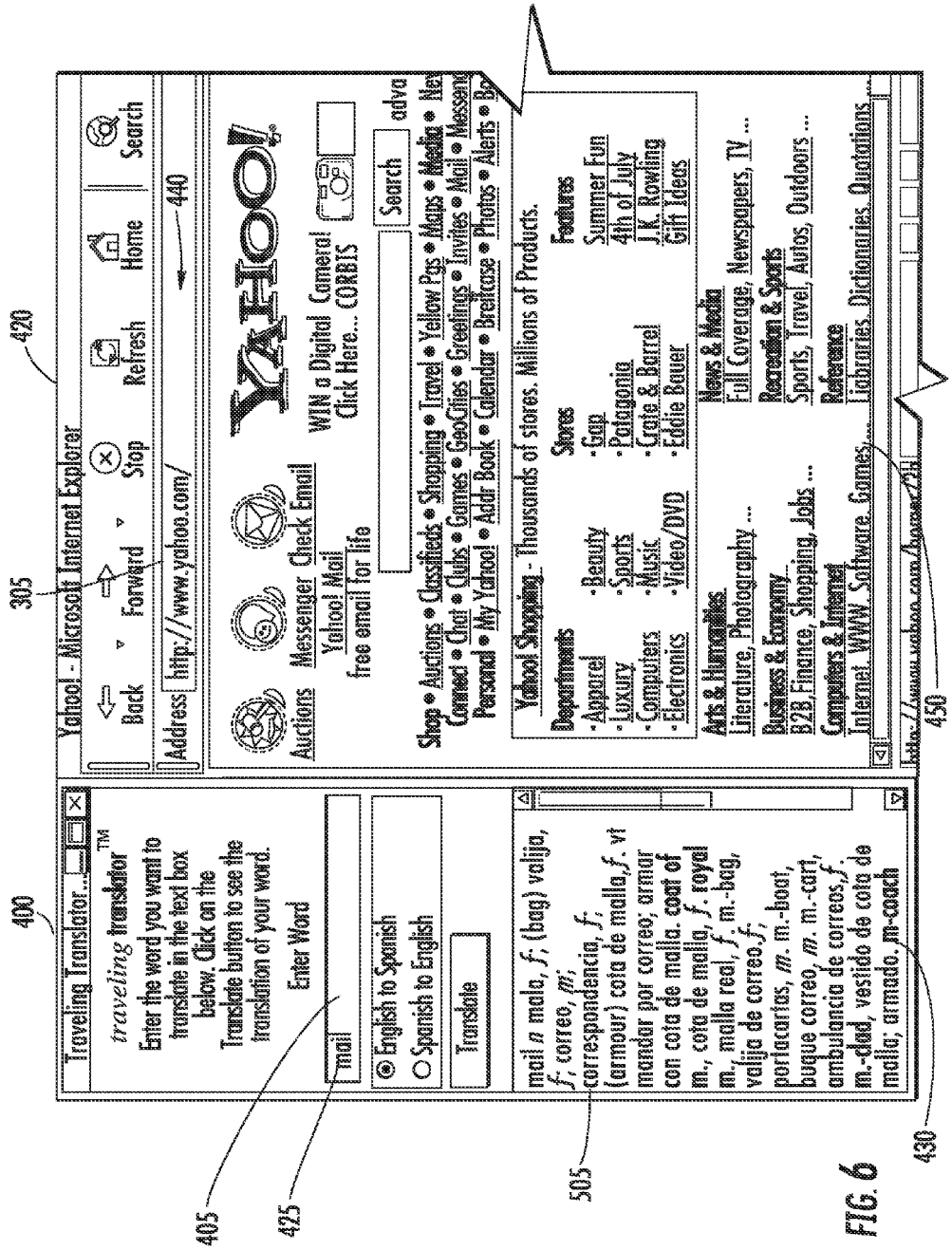
FIG. 6 depicts a translation window with a translation output adjacent to a Web page window.

After placing a word or phrase in input field 405, the user clicks on the "Translate" button 415. The translator, which is linked to a translation dictionary database accessible through the Internet, provides a translation 505 of the target word or phrase 425 in the input field 405 to the user, in the output field 430, as shown in FIG. 6. In an embodiment, the translation 505 comprises one or more dictionary definitions of the target word 425. In an embodiment, the translation 505 includes all the various meanings for all the forms, i.e., verb, noun, adjective, adverb, etc., of the target word 425. As the correct meaning of a word is often dictated by its context of use, by providing the user the various dictionary definitions of the target word 425, the user is encouraged to learn and apply the appropriate definition of the target word 425 in the context from which it is currently derived.

An embodiment JavaScript code 650 for creating a server query, and opening a Web page window on a user's screen is shown in FIGS. 8A, 8B, and 8C.

Figure 7:
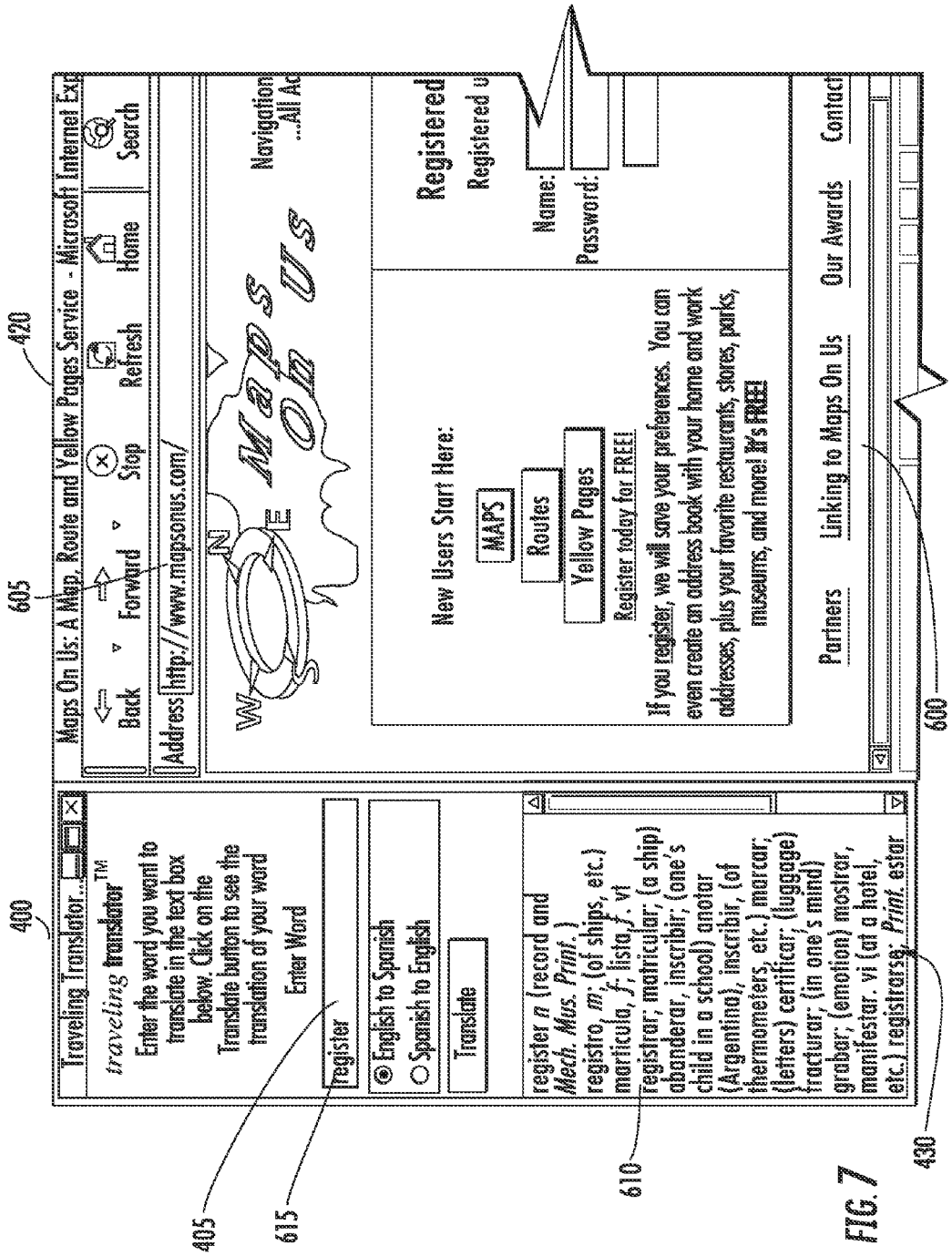
FIG. 7 depicts a translation window with a translation output adjacent to a Web page window containing a tertiary Web page.

In an embodiment, if the user moves from the secondary Web page 450 to a third, or tertiary, Web page, by typing a second URL in the address box 440 of the secondary Web page 450, the tertiary Web page is displayed on the user's screen such that both the tertiary Web page and the translation window 400 are visible with no overlapping. As seen in FIG. 7, Web page window 420 containing tertiary Web page 600 for the URL 605, is shown next to translation window 400. The user may input another target word 615 (e.g., "register") to the input field 405 of the translation window 400, and obtain a translation definition 610 in output field 430.

A user can continue to input words or phrases into the translation window, always with the ability to select for any translation to translate from English to their translation language or from their translation language to English. The user may also continue to access new Web pages in conjunction with the translator window, viewable on the same user screen with no overlap, by writing the URL of the desired Web page in the address box of the current Web page displayed on their screen.

Thus, in an embodiment, the system and method for language translation provides the user with translation capabilities for each Web page as he/she "browses" the Internet until the user closes or reduces the translation window 400. This translation language system and method facilitates language learning as it is useful and convenient. Yet this language learning system and method encourages language learning by requiring the user to determine the correct definition of any particular word or phrase as dictated by the context in which the word or phrase is currently being used.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method for language translation comprising:
   providing program code to launch a translation window associated with a primary window;
   providing a link to the program code, wherein when the primary window is displayed on a screen the program code causes the translation window to open on the screen together with the primary window;
   in the translation window, receiving input information in a first language;
   translating the input information from the first language to information in a second language; and
   in the translation window, outputting the information in the second language.

2. The method of claim 1 wherein the program code comprises JavaScript language code invoked when the link is selected.

3. The method of claim 1 wherein the program code comprises JavaScript language code stored at a Web site associated with the primary window.

4. The method of claim 1 wherein before the user selects the link, the translation window does not appear on the screen.

5. The method of claim 1 comprising:
   adjusting the size and position of the translation window so that the translation window and the primary window fit on one user-viewable screen.

6. The method of claim 1 wherein the program code causes the translation window to be positioned and sized so that the translation window and the primary window fit on one screen without overlapping.

7. The method of claim 1 comprising:
   displaying a translation direction field in the translation window, wherein the translation direction field provides a selection between at least two options and is implemented using a radio button graphical user interface element.

8. The method of claim 1 wherein the primary window comprises a document.

9. The method of claim 1 wherein a length of the translation window is longer than its width.

10. The method of claim 1 wherein the translating the input information from the first language to information in a second language comprises:
    querying a first source for the information in the second language, wherein the first source is a different from a second source for which a document is being displayed in the primary window.

11. The method of claim 10 wherein the first source is a translation dictionary database accessible through the Internet.

12. The method of claim 1 wherein the input information in the first language is received in a text box, and before displaying the text box, in the translation window, prompting the user to select a translation language.

13. The method of claim 12 wherein after the user selects the translation language, along with displaying the text box, displaying a translation direction field.

14. The method of claim 12 wherein the information in the second language is presented in a scroll box and is scrollable without having a text box comprising the input information move out of view in the translation window.

15. The method of claim 1 wherein the input information comprises two or more words in the first language.

16. The method of claim 1 wherein the user can move the translation window to any position on the screen.

17. The method of claim 1 wherein the user can resize the translation window.

18. A method comprising:
    providing program code to launch a translation window associated with a primary window;
    providing a link to the program code, wherein when the primary window is displayed on a screen the program code causes the translation window to open on the screen with the primary window, and the translation window will be positioned so that the translation window does not overlap the primary window;
    receiving input information in a first language in a text box of the translation window;

translating the input information from the first language to information in a second language, wherein the information in the second language is received from a first source; and displaying the information in the second language in the translation window, wherein the translation window has a length longer than its width.

19. The method of claim 18 wherein the first source is different from a second source for which a document is displayed in the primary window.

20. The method of claim 18 wherein the first source is accessed using the Internet.

21. The method of claim 18 comprising:
permitting the user to specify a translation language in the translation window.

22. The method of claim 18 comprising:
permitting the user to specify a translation direction in the translation window.

23. The method of claim 18 wherein the input information comprises a word or a sentence.

24. The method of claim 18 wherein the translation window is positioned beside the primary window.

25. The method of claim 18 wherein a width of the translation window is less than a width of the primary window.

26. A method comprising:
providing program code to launch a translation window associated with a primary window;

providing a first link to the program code, wherein when the primary window is displayed on a screen, the program code causes the translation window to open on the screen beside the primary window, the translation window will be positioned so that the translation window does not overlap the primary window, the translation window has a length longer than its width, and a width of the translation window is less than a width of the primary window;

providing a text box in the translation window to receive input information in a first language;

providing a second link in the translation window, wherein when the user selects the second link, the program code causes translating of the input information from the first language to output information in a second language, and the output information is obtained through accessing the Internet; and providing for display of the output information in the second language in the translation window.

27. The method of claim 26 comprising:
providing in the translation window at least one field for the user to specify a translation language and a translation direction.

28. The method of claim 26 wherein the output information is displayed below the text box.

29. The method of claim 27 wherein the output information is displayed below the text box and below the at least one field.

30. The method of claim 26 wherein before being opened, the translation window is not laid out as a frame of a Web browser.

31. The method of claim 26 wherein the primary window is not a first frame of a Web browser, and the second frame is not a second frame of the Web browser.

* * * * *